H. A. DREFFEIN.
APPARATUS FOR MANUFACTURE OF GASOLINE OR THE LIKE.
APPLICATION FILED APR. 11, 1916.
1,413,327. Patented Apr. 18, 1922.
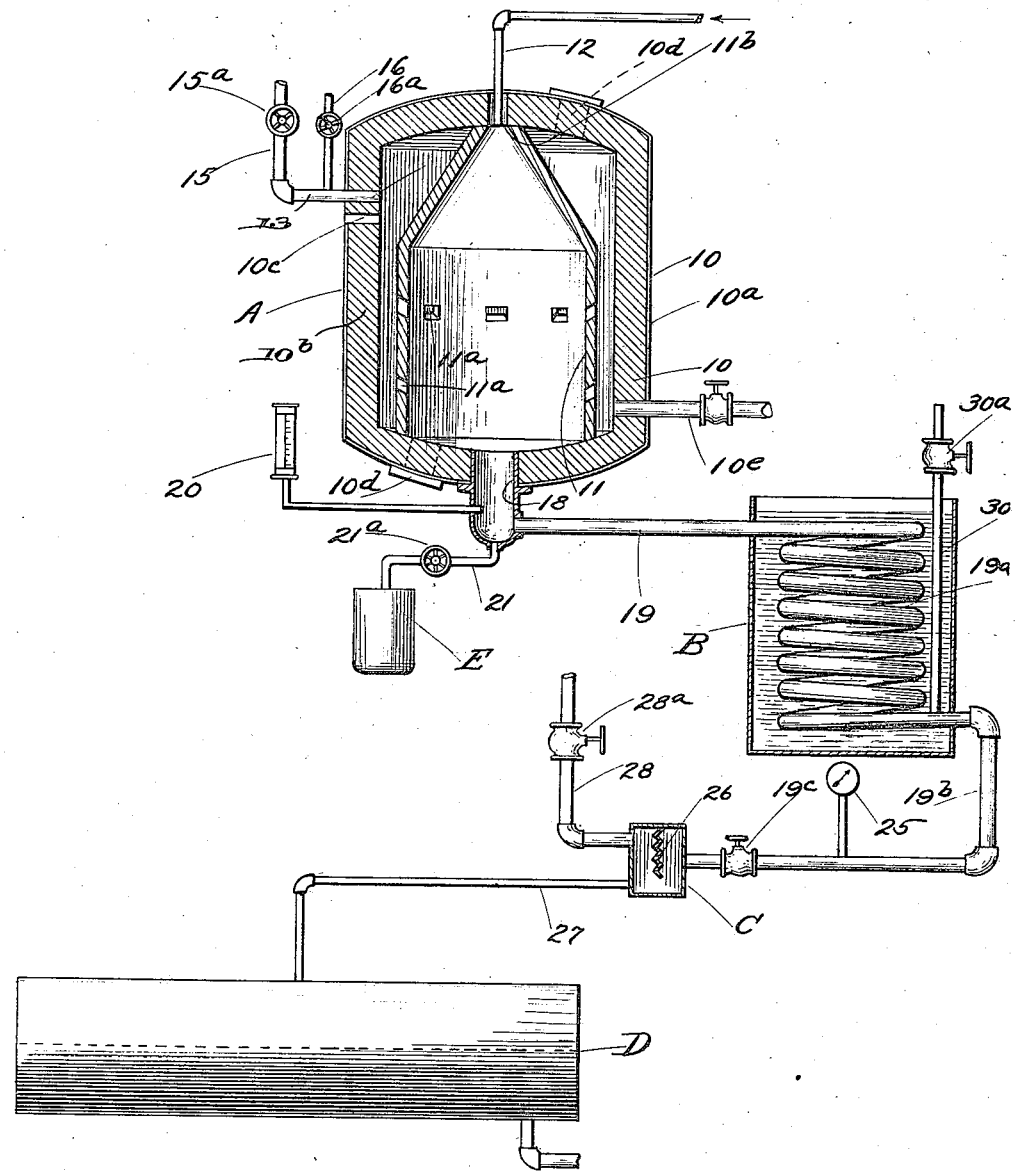

UNITED STATES PATENT OFFICE.

HENRY A. DREFFEIN, OF CHICAGO, ILLINOIS.

APPARATUS FOR MANUFACTURE OF GASOLINE OR THE LIKE.

1,413,327.   Specification of Letters Patent.   Patented Apr. 18, 1922.

Application filed April 11, 1916. Serial No. 90,346.

*To all whom it may concern:*

Be it known that I, HENRY A. DREFFEIN, a citizen of the United States, residing at Chicago, in the county of Cook and State of Illinois, have invented certain new and useful Improvements in Apparatus for Manufacture of Gasoline or the like, of which the following is a specification.

This invention relates to improvements in apparatus for the manufacture of gasoline, or the like. It has for its object to provide an apparatus for carrying out an improved process which will be more efficient and economical for "cracking" and distilling base oils, such as crude oil, to manufacture the lighter and more volatile fuel oils, such as gasoline, toluol, or the like.

Hitherto in cracking base oils it has been impossible to obtain apparatus which would withstand, for any considerable length of time, the intense heat and pressure necessary to more efficiently operate, and it is to overcome this objection that I have primarily invented and designed my improved apparatus, more fully set forth below, and shown in the accompanying drawing in which I have shown a diagrammatic view, partially in section, of my improved apparatus. Like numerals refer to like elements.

In the drawing, A designates generally the "cracking" apparatus; B the condensing apparatus; C a separator; D the collection tank; and E a tar pot.

The cracking apparatus consists of a combustion chamber 10 comprising an encasing shell $10^a$ of steel, or the like, within which is provided a thick lining $10^b$ of refractory brick, or the like. Located within the combustion casing 10, and spaced inwardly from the walls thereof is the cracking casing 11 shown as tapered at its upper portion, this casing being preferably constructed of refractory material. In the shell or casing 11 are provided the ducts or passages $11^a$, communicating between the interior of the casing 11 and the interior of casing 10, as will be apparent. An inlet $11^b$ is provided at the top of the casing 11, and extending thereinto through the top of the combustion casing 10 is the oil supply pipe 12, through which is supplied the crude oil or other base. A sight aperture or peep-hole $10^c$ is provided in the side wall of casing 10. A burner 13 also extends through the side wall of casing 10, preferably adjacent the tapered portion of the casing 11 and communicating with this burner 13 is the air supply pipe 15 and fuel supply pipe 16, suitable valves $15^a$ and $16^a$ being provided to regulate communication therethrough. Clean-out openings $10^d$, normally closed, are provided where necessary in the casing 10 to enable ready cleaning of the interior of the shell A. I provide also a valved exhaust pipe $10^e$ which may extend to a safe discharge point for a purpose hereinafter described.

The casing 11 extends to and is closed by the bottom of casing 10 which is preferably interiorly concaved and leading therefrom is provided the outlet duct 18 from which leads the pipe 19. A thermometer or other temperature indicating member 20 is also in communication with the duct 18 and leading from the bottom of the latter is the pipe 21 leading to tar pot E whereby tar or other residuum may be drawn from the casing 10 and duct 18 into the tar pot E, flow therethrough being prevented or permitted by means of the valve $21^a$. The pipe 19 is coiled, as indicated at $19^a$, the coiled portions being located inside the condensing tank B, and terminating in the portion $19^b$ which leads to a separator or expansion chamber C, a valve $19^c$ being provided in the line to control flow as will be more fully explained hereinafter. A pressure gauge 25 also communicates with the pipe $19^b$. The separator C I have shown as of well-known construction, comprising a closed casing in which is located a corrugated baffle 26. From the lower portion of the separator C leads the pipe 27 functioning to lead the condensed fluid to the collection tank D from which it may be drawn off, as desired. A gas exhaust pipe 28 leads from the separator C and may terminate in the atmosphere, or a cistern, or other suitable point of delivery, flow therethrough being regulated by the valve $28^a$.

I carry out my process with the above described apparatus as follows: The manhole cover $10^d$ is removed to provide proper vent for the burner gases to insure proper ignition and burning of the same. Suitable fuel mixture is delivered to and through the burner 13 under pressure and ignited. In the starting of the apparatus this burner operates with the manhole cover $10^d$ open, as stated above, until the interior of the casing A and the top of retort 11 are heated, after which the manhole may be closed since the burning will thereafter properly operate without danger of its going out. During the subsequent heating the valve 19ᶜ is opened to an amount which trial has shown to be correct, permitting flow through the apparatus and insuring the continuation of combustion in the casing A. When the interior of the latter and the retort are heated to the desired point for the product which it is desired to obtain, the base oil, such as crude oil, is admitted through pipe 12 under suitable pressure necessary to force it into the retort against the pressure which builds or will be built up therein. This base oil is preferably finely divided or sprayed into the still and, as shown by the drawings, it is delivered adjacent the top 11ᵇ of the cracking casing 11, the hottest portion thereof. The valve and pipe 10ᵉ is maintained in open or normally open position to permit the exhaust into the outside atmosphere of a portion of the products of combustion, thereby reducing the total amount thereof which it is necessary to remove from the product obtained as a result of distillation or cracking. By proper manipulation of the valve 19ᶜ, which controls the flow of gases both distilled and burned from the casing A, it will be obvious that the pressure in the latter may be maintained at the point desired. The burner supply of fuel being introduced under pressure, this pressure will build up to a desired point when flow from the casing A is properly controlled by the valve 19ᶜ, as will be obvious.

As is well known to those skilled in the art, different products require different pressures and different temperatures, which may be readily obtained by the control of the burner apparatus and the valve 19ᶜ, respectively. Gas resulting from the cracking of the base oil will flow into the pipe 19 at a high temperature and at the pressure obtaining in the casing, and from thence into the condensing coil 19ᵃ where it will be condensed and flow through the pipe 19ᵇ, still under some pressure, into the separator C where expansion takes place and consequent further cooling which will result in the condensation of any uncondensed fuel gas. From the separator C the product is carried to the collection tank D from which it may be drawn, as desired. In controlling the pressure, it will be apparent that the escape valve 21ᵃ and the valve in line 10ᵉ will in a slight measure affect the pressure obtaining in the casing A, but this escape is taken care of by the proper regulation of valve 19ᶜ.

It will be obvious that by means of the ports or passages 11ᵃ in the cracking casing 11, pressure within such casing will balance the pressure on the exterior thereof and the heating flame and gas admitted through burner 13 will be allowed to mingle with the cracking base whereby efficient heating is obtained and such gas of combustion is carried out with the cracked gas. As the latter is condensed into gasoline, or the like, the gases of combustion remain and may be drawn off through the pipe 28. I also provide an additional gas draw-off means comprising the pipe 30 having the valve 30ᵃ, and leading upwardly from the pipe 19ᵇ in the condenser B, at which point the major portion of the product has been condensed. As explained above, any tar or residuum is collected from the duct 18 and gathered in receptacle E. The application of the flame is continuous during the practice of my process. It is also to be noted that I preferably supply the base oil at such a rate that little or no liquid is present as a body in the interior of the cracking casing 11 during the practice of the process.

When it is desired to manufacture toluol, or the like, I find it advisable to have the gas at approximately 1200° F. when leaving the cracking casing, and at a pressure of approximately 150 lbs. In other respects the process is similar to that described above.

It will be apparent that my cracking casing proper 11 may be constructed of comparatively thin material rendering its heating easy and thereby permitting a more efficient operation of the apparatus. This is made possible in view of the fact that the pressures within and without the casing 11 are balanced by means of the ports 11ᵃ. The casing 10 is constructed in a strong and substantial manner so as to readily withstand the temperature and pressure conditions, and its construction in such manner is made possible by the fact that it is not necessary to transmit or conduct heat therethrough. In addition, I obtain more efficient heating of the base or crude oil by means of the fact that I mingle my heating flame directly with the cracking gas. In some instances I may reduce the amount of the products of combustion mixing with the cracking base by permitting discharge of same through pipe 10ᵉ. I may thereby discharge all products of combustion not necessary for mixture with the base for direct heating of the same.

It will be apparent that my process and apparatus are capable of numerous modifications, and I do not wish to be restricted to the form shown or described beyond the scope of the appended claims.

What I claim is:

1. In apparatus of the class described, a combustion chamber, and a cracking chamber located therein, said cracking chamber being in communication with said combustion chamber whereby the pressures within and without said cracking casing will be balanced.

2. In apparatus of the class described, a combustion chamber, and a cracking casing located therein and constructed of refractory material, said cracking casing being in communication with the interior of said combustion chamber.

3. In apparatus of the class described, a combustion casing, a cracking casing located therein, means to supply base oil or the like to the interior of said cracking casing, means to apply a heating flame to the exterior of said cracking casing, and means to maintain a substantially balanced pressure in said casings.

4. In apparatus of the class described, a combustion casing, a cracking casing located therein, means to supply base oil or the like to the interior of said cracking casing, and means to apply a heating flame to the exterior of said cracking casing, said cracking casing being in communication with the interior of said combustion casing.

5. In apparatus of the class described, a combustion casing, a cracking casing located therein and in communication therewith, means to supply base oil or the like to the interior of said cracking casing, and means to apply a heating flame to the exterior of said cracking casing adjacent the top of said cracking casing.

6. In apparatus of the class described, a combustion casing, and a cracking casing located therein and in communication therewith, the latter having its upper portion tapered, the bottom of said combustion casing forming the bottom of said cracking casing.

7. In apparatus of the class described, a combustion casing, and a cracking casing located therein, the latter having its upper portion tapered, the bottom of said combustion casing forming the bottom of said cracking casing, said cracking casing being provided with ports or passages leading from its interior to the interior of said combustion casing.

8. In apparatus of the class described, a combustion casing, a cracking casing located therein, the latter having its upper portion tapered, the bottom of said combustion casing forming the bottom of said cracking casing, said cracking casing being provided with ports or passages leading from its interior to the interior of said combustion casing, and means to permit exhaust directly from said combustion casing of products of combustion.

In testimony whereof, I have subscribed my name.

HENRY A. DREFFEIN.